United States Patent
Xie et al.

(10) Patent No.: US 11,431,615 B2
(45) Date of Patent: Aug. 30, 2022

(54) MULTICAST DATA PACKET PROCESSING METHOD AND APPARATUS

(71) Applicant: Huawei Technologies Co., Ltd., Shenzhen (CN)

(72) Inventors: Jingrong Xie, Beijing (CN); Gang Yan, Beijing (CN); Yang Xia, Beijing (CN); Shunwan Zhuang, Beijing (CN); Guoyi Chen, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/080,404

(22) Filed: Oct. 26, 2020

(65) Prior Publication Data
US 2021/0044514 A1    Feb. 11, 2021

Related U.S. Application Data

(63) Continuation of application No. PCT/CN2019/076214, filed on Feb. 27, 2019.

(30) Foreign Application Priority Data

Apr. 27, 2018 (CN) .......................... 201810395277.7

(51) Int. Cl.
*H04L 12/28*    (2006.01)
*H04L 45/16*    (2022.01)
(Continued)

(52) U.S. Cl.
CPC ............. *H04L 45/16* (2013.01); *H04L 12/18* (2013.01); *H04L 45/74* (2013.01); *H04L 47/825* (2013.01)

(58) Field of Classification Search
None
See application file for complete search history.

(56) References Cited

U.S. PATENT DOCUMENTS 9,762,488 B2 * 9/2017 Previdi ................. H04L 45/308
9,923,835 B1 * 3/2018 Singh .................. H04L 12/4633
(Continued)

FOREIGN PATENT DOCUMENTS

CN    102638395 A    8/2012
CN    106341327 A    1/2017
(Continued)

OTHER PUBLICATIONS

T. Eckert et al., "Traffic Engineering for Bit Index Explicit Replication BIER-TE; draft-eckert-bier-te-arch-06," Network Working Group, Internet-Draft, XP015123153, total 30 pages (Nov. 16, 2017).

(Continued)

*Primary Examiner* — Gerald A Smarth
(74) *Attorney, Agent, or Firm* — Leydig, Voit & Mayer, Ltd.

(57) ABSTRACT

This application provides a multicast data packet processing method and a forwarding device. The method implemented by a first forwarding device includes: establishing a segment routing header SRH-based tunnel with a third forwarding device, wherein the SRH-based tunnel passes through a second forwarding device that does not support bit index explicit replication BIER; generating a first multicast data packet based on a multicast data packet from a multicast source and the SRH-based tunnel, wherein the first multicast data packet includes a first packet header, a second packet header, and the multicast data packet from the multicast source, the first packet header includes an SRH header, and a destination address included in the second packet header is an address of the second forwarding device; and sending the first multicast data packet to the second forwarding device through the SRH-based tunnel.

16 Claims, 11 Drawing Sheets

(51) Int. Cl.
*H04L 12/18* (2006.01)
*H04L 45/74* (2022.01)
*H04L 47/70* (2022.01)

(56) References Cited

U.S. PATENT DOCUMENTS

| | | | |
|---|---|---|---|
| 9,942,053 | B2 | 4/2018 | Wijnands et al. |
| 2015/0078379 | A1 | 3/2015 | Wijnands et al. |
| 2015/0085635 | A1 | 3/2015 | Wijnands et al. |
| 2016/0218961 | A1 | 7/2016 | Lindem, III et al. |
| 2016/0254988 | A1 | 9/2016 | Eckert et al. |
| 2018/0241671 | A1* | 8/2018 | Bosch .................. H04L 45/741 |
| 2019/0386850 | A1* | 12/2019 | Zhang ................. H04L 12/1836 |
| 2019/0394059 | A1* | 12/2019 | Zhang .................... H04L 45/16 |

FOREIGN PATENT DOCUMENTS

| | | | |
|---|---|---|---|
| CN | 106572017 | A | 4/2017 |
| CN | 106572021 | A | 4/2017 |
| CN | 106572023 | A | 4/2017 |
| CN | 106603413 | A | 4/2017 |
| CN | 106656794 | A | 5/2017 |
| CN | 107749831 | A | 3/2018 |
| EP | 3322140 | A1 | 5/2018 |
| WO | 2015042152 | A1 | 3/2015 |
| WO | 2015042159 | A1 | 3/2015 |
| WO | 2017124709 | A1 | 7/2017 |
| WO | 2018010658 | A1 | 1/2018 |

OTHER PUBLICATIONS

J. Xie et al., "Encapsulation for BIER in Non-MPLS IPv6 Networks; draft-xie-bier-6man-encapsulation-00," Network Working Group, Internet-Draf, IETF, XP015126147, total 10 pages (Apr. 28, 2018).

Filsfils et al., "SRv6 Network Programming, draft-filsfils-spring-srv6-network-programming-04," Spring IETF Internet Draft, pp. 1-57, Internet Engineering Task Force (IETF), Fremont, California (Mar. 2018).

Previdi et al., "IPv6 Segment Routing Header (SRH), draft-ietf-6man-segment-routing-header-06," Network Working Group IETF Internet-Draft, pp. 1-35, Internet Engineering Task Force (IETF), Fremont, California (Mar. 2017).

Krishnan et al., "A Uniform Format for IPv6 Extension Headers," RFC 6564, pp. 1-6, Internet Engineering Task Force (IETF), Fremont, California (Apr. 2012).

Deering et al., "Internet Protocol, Version 6 (IPv6) Specification," RFC 8200, pp. 1-42, Internet Engineering Task Force (IETF), Fremont, California (Jul. 2017).

Wijnands et al., "Multicast Using Bit Index Explicit Replication (BIER)," RFC 8279, pp. 1-43, Internet Engineering Task Force (IEIF), Fremont, California (Nov. 2017).

Wijnands et al., "Encapsulation for Bit Index Explicit Replication (BIER) in MPLS and Non-MPLS Networks", Internet Engineering Task Force (IETF), RFC 8296, pp. 1-24, Internet Engineering Task Force (IETF), Fremont, California (Jan. 2018).

\* cited by examiner

CONT.
FROM

MULTICAST DATA PACKET PROCESSING METHOD AND APPARATUS

CROSS-REFERENCE TO RELATED APPLICATIONS

This application is a continuation of International Application No. PCT/CN2019/076214, filed on Feb. 27, 2019, which claims priority to Chinese Patent Application No. 201810395277.7, filed on Apr. 27, 2018. The disclosures of the aforementioned applications are hereby incorporated by reference in their entireties.

TECHNICAL FIELD

Embodiments of this application relate to the field of communications technologies, and in particular, to a multicast data packet processing method and an apparatus.

BACKGROUND

In a multicast technology, a specific multicast address is used to transmit a multicast data packet to a host set corresponding to a multicast group according to a maximum delivery principle. A basic method of the multicast technology is as follows: A source host sends only one multicast data packet, and a destination address of the multicast data packet is a multicast group address. Each receiver in the multicast group may receive one multicast data packet. Bit index explicit replication (BIER) technology is a new multicast technology. Specifically, in a multicast network, each edge node is allocated with a globally unique bit position. Each edge node floods its bit position in the network through an interior gateway protocol (IGP), so that another node in the network can learn an edge node corresponding to each bit position. When a first edge node sends multicast data to a second edge node and a third edge node, the first edge node may encapsulate a BIER header into a to-be-sent multicast data packet. The BIER header includes a bit string. The bit string indicates that the multicast data packet needs to be sent to the second edge node and the third edge node. After receiving the multicast data packet including the BIER header, a non-edge node in the network forwards the multicast data packet based on the bit string in the BIER header, so that the multicast data packet can reach the second edge node and the third edge node.

When the BIER technology is deployed in the multicast network, a device in the multicast network needs to support the BIER technology. However, a device in an existing network needs to be upgraded to support the BIER technology. Consequently, the BIER technology has relatively high deployment costs and relatively great deployment difficulty.

SUMMARY

Embodiments of this application provide a multicast data packet processing method and an apparatus, to reduce deployment costs and deployment difficulty.

To achieve the foregoing objectives, the following technical solutions are used in the embodiments of this application.

According to a first aspect, a multicast data packet processing method is provided. The method includes: establishing, by a first forwarding device, a segment routing header SRH-based tunnel with a third forwarding device, where the SRH-based tunnel passes through a second forwarding device that does not support bit index explicit replication BIER; generating, by the first forwarding device, a first multicast data packet based on a multicast data packet from a multicast source and the SRH-based tunnel, where the first multicast data packet includes a first packet header, a second packet header, and the multicast data packet from the multicast source, the first packet header includes an SRH header, and a destination address included in the second packet header is an address of the second forwarding device; and sending, by the first forwarding device, the first multicast data packet to the second forwarding device through the SRH-based tunnel.

Optionally, the first multicast data packet further includes a third packet header. The third packet header is encapsulated between the first packet header and the multicast data packet from the multicast source and includes a BIER header. The BIER header includes a bit string. The bit string is used to indicate an edge node that receives the multicast data packet from the multicast source.

Optionally, the SRH header includes a segment left SL, a first segment list, a second segment list, and a third segment list. A value of the SL is 2. The first segment list (SRH[0]) carries a multicast address. The second segment list (SRH[1]) carries an address of the third forwarding device. The third segment list (SRH[2]) carries the address of the second forwarding device.

Optionally, the generating, by the first forwarding device, a first multicast data packet based on a multicast data packet from a multicast source and the SRH-based tunnel includes:

writing, by the first forwarding device, an obtained multicast address into the first segment list, and writing the address, carried in the third segment list (SRH[2]), of the second forwarding device into the destination address of the second packet header, to generate the first multicast data packet.

According to a second aspect, a multicast data packet processing method is provided. The method includes: receiving, by a second forwarding device, a first multicast data packet sent by a first forwarding device, where the first multicast data packet includes a first packet header, a second packet header and a multicast data packet from a multicast source, the first packet header includes an SRH header, and a destination address included in the second packet header is an address of the second forwarding device; obtaining, by the second forwarding device, a second multicast data packet based on the first multicast data packet and the destination address included in the first multicast data packet, where the second multicast data packet includes a third packet header, a fourth packet header, and the multicast data packet from the multicast source, the third packet header is an SRH header different from the first packet header, and a destination address included in the fourth packet header is an address of a third forwarding device; and sending, by the second forwarding device, the second multicast data packet to the third forwarding device based on the destination address included in the fourth packet header.

Optionally, the second multicast data packet further includes a fifth packet header. The fifth packet header is encapsulated between the third packet header and the multicast data packet from the multicast source. The fifth packet header includes a BIER header. The BIER header includes a bit string. The bit string is used to indicate an edge node that receives the multicast data packet from the multicast source.

Optionally, the SRH header includes a segment left SL, a first segment list, a second segment list, and a third segment list. A value of the SL is 1. The first segment list (SRH[0]) carries a multicast address. The second segment list (SRH

[1]) carries the address of the third forwarding device. The third segment list (SRH[2]) carries the address of the second forwarding device.

Optionally, the obtaining, by the second forwarding device, a second multicast data packet based on the first multicast data packet and the destination address included in the first multicast data packet includes:

obtaining, by the second forwarding device, the third packet header after subtracting 1 from a value of an SL in the first packet header;

obtaining, by the second forwarding device, the fourth packet header by replacing, based on the value of the SL in the third packet header, the destination address of the second packet header with a parameter carried in the second segment list of the third packet header; and obtaining, by the second forwarding device, the second multicast data packet based on the third packet header, the fourth packet header, and the multicast data packet from the multicast source.

According to a third aspect, a multicast data packet processing method is provided. The method includes: obtaining, by a first forwarding device, a second multicast data packet based on a first multicast data packet, where the first multicast data packet is a multicast data packet from a multicast source, or a multicast data packet from a second forwarding device that does not support BIER, and the second multicast data packet includes a bit string; and sending, by the first forwarding device, the second multicast data packet to a corresponding edge node based on the bit string.

Optionally, the multicast data packet from the second forwarding device that does not support the BIER includes a first packet header, a second packet header, and the multicast data packet from the multicast source. The first packet header includes an SRH header. A destination address of the second packet header is an address of the first forwarding device.

Optionally, a destination address of the second multicast data packet is a multicast address. The multicast address is used to instruct the first forwarding device to perform forwarding based on the bit string.

According to a fourth aspect, a first forwarding device is provided. The first forwarding device includes: an establishment unit, configured to establish a segment routing based SRH-based tunnel with a third forwarding device, where the SRH-based tunnel passes through a second forwarding device that does not support bit index explicit replication BIER; a generation unit, configured to generate a first multicast data packet based on a multicast data packet from a multicast source and the SRH-based tunnel, where the first multicast data packet includes a first packet header, a second packet header, and the multicast data packet from the multicast source, the first packet header includes an SRH header, and a destination address included in the second packet header is an address of the second forwarding device; and a sending unit, configured to send the first multicast data packet to the second forwarding device through the SRH-based tunnel.

Optionally, the first multicast data packet further includes a third packet header. The third packet header is encapsulated between the first packet header and the multicast data packet from the multicast source and includes a BIER header. The BIER header includes a bit string. The bit string is used to indicate an edge node that receives the multicast data packet from the multicast source.

Optionally, the SRH header includes a segment left SL, a first segment list, a second segment list, and a third segment list. A value of the SL is 2. The first segment list (SRH[0]) carries a multicast address. The second segment list (SRH[1]) carries an address of the third forwarding device. The third segment list (SRH[2]) carries the address of the second forwarding device.

Optionally, the generation unit is specifically configured to: write an obtained multicast address into the first segment list, and write the address, carried in the third segment list (SRH[2]), of the second forwarding device into the destination address of the second packet header, to generate the first multicast data packet.

According to a fifth aspect, a second forwarding device is provided. The second forwarding device includes: a receiving unit, configured to receive a first multicast data packet sent by a first forwarding device, where the first multicast data packet includes a first packet header, a second packet header, and a multicast data packet from a multicast source, the first packet header includes an SRH header, and a destination address included in the second packet header is an address of the second forwarding device; an obtaining unit, configured to obtain a second multicast data packet based on the first multicast data packet and the destination address included in the first multicast data packet, where the second multicast data packet includes a third packet header, a fourth packet header, and the multicast data packet from the multicast source, the third packet header is an SRH header different from the first packet header, and a destination address included in the fourth packet header is an address of a third forwarding device; and a sending unit, configured to send the second multicast data packet to the third forwarding device based on the destination address included in the fourth packet header.

Optionally, the second multicast data packet further includes a fifth packet header. The fifth packet header is encapsulated between the third packet header and the multicast data packet from the multicast source. The fifth packet header includes a BIER header. The BIER header includes a bit string. The bit string is used to indicate an edge node that receives the multicast data packet from the multicast source.

Optionally, the SRH header includes a segment left SL, a first segment list, a second segment list, and a third segment list. A value of the SL is 1. The first segment list (SRH[0]) carries a multicast address. The second segment list (SRH[1]) carries the address of the third forwarding device. The third segment list (SRH[2]) carries the address of the second forwarding device.

Optionally, the obtaining unit is specifically configured to: obtain the third packet header after subtracting 1 from a value of an SL in the first packet header; obtain the fourth packet header by replacing, based on the value of the SL in the third packet header, the destination address of the second packet header with a parameter carried in the second segment list of the third packet header; and obtain the second multicast data packet based on the third packet header, the fourth packet header, and the multicast data packet from the multicast source.

According to a sixth aspect, a first forwarding device is provided. The first forwarding device includes: an obtaining unit, configured to obtain a second multicast data packet based on a first multicast data packet, where the first multicast data packet is a multicast data packet from a multicast source, or a multicast data packet from a second forwarding device that does not support BIER, and the second multicast data packet includes a bit string; and a sending unit, configured to send the second multicast data packet to a corresponding edge node based on the bit string.

Optionally, the multicast data packet from the second forwarding device that does not support the BIER includes a first packet header, a second packet header, and the multicast data packet from the multicast source. The first packet header includes an SRH header. A destination address of the second packet header is an address of the first forwarding device.

Optionally, a destination address of the second multicast data packet is a multicast address. The multicast address is used to instruct the first forwarding device to perform forwarding based on the bit string.

According to a seventh aspect, a computer storage medium is provided. The computer storage medium may be configured to store a computer program instruction, and the computer program instruction may be used to perform the method provided in the first aspect, the second aspect, or the third aspect.

According to an eighth aspect, a forwarding device is provided. The forwarding device includes a memory and a processor. The memory is configured to store an instruction, and the processor reads the instruction from the memory, to perform the method provided in the first aspect, the second aspect, or the third aspect.

DESCRIPTION OF EMBODIMENTS

The following describes a method and an apparatus provided in the embodiments of this application with reference to the accompanying drawings.

Embodiment 1

FIG. 1 and FIG. 2A to FIG. 2D are schematic diagrams of two scenarios in Embodiment 1. To be specific, A1 is an intermediate node in the scenario in FIG. 1, and a root node in the scenario in FIG. 2A to FIG. 2D. In the scenarios shown in FIG. 1 and FIG. 2A to FIG. 2D, intermediate nodes of a multicast tree include A9, A2, A3, and A4. Leaf nodes of the multicast tree include A5 and A6. In the scenarios provided in Embodiment 1, A9 and A2 are forwarding devices that do not support a BIER technology. A1, A3, A4, A5, and A6 support the BIER technology. A1, A9, A2, A3, A4, A5, and A6 support an internet protocol version 6 (IPv6) technology and an IPv6 segment routing (SRv6) technology. To transmit a multicast data packet through a forwarding device that does not support the BIER technology in a network, a tunnel may be established between A1 and A3. The tunnel may be a tunnel based on a segment routing header (SRH). The multicast data packet may be transmitted between A3 and A5 through the BIER technology. The multicast data packet may be transmitted between A3 and A6 through the BIER technology. In the scenarios shown in FIG. 1 and FIG. 2A to FIG. 2D, A9, A2, A3, and A4 may flood respective segment identifiers (SID) in the network through an IGP, so that each node that supports the SRv6 in the network can learn an SID of another node. A5 and A6 may flood respective bit positions in the network through the IGP, so that each node that supports the BIER in the network can learn a bit position of an edge node. Nodes A1, A3, A4, A5, and A6 that support the BIER technology each set a common multicast address. The multicast address is used to indicate BIER information. A1, A3, A4, A5, and A6 may obtain the multicast address in the following manners: configuring and setting the multicast address by each node, or specifying the multicast address over a protocol, or carrying the multicast address through IGP flooding, or carrying the multicast address over a PIM protocol, to determine that the multicast address indicates the BIER information.

Figure 1:
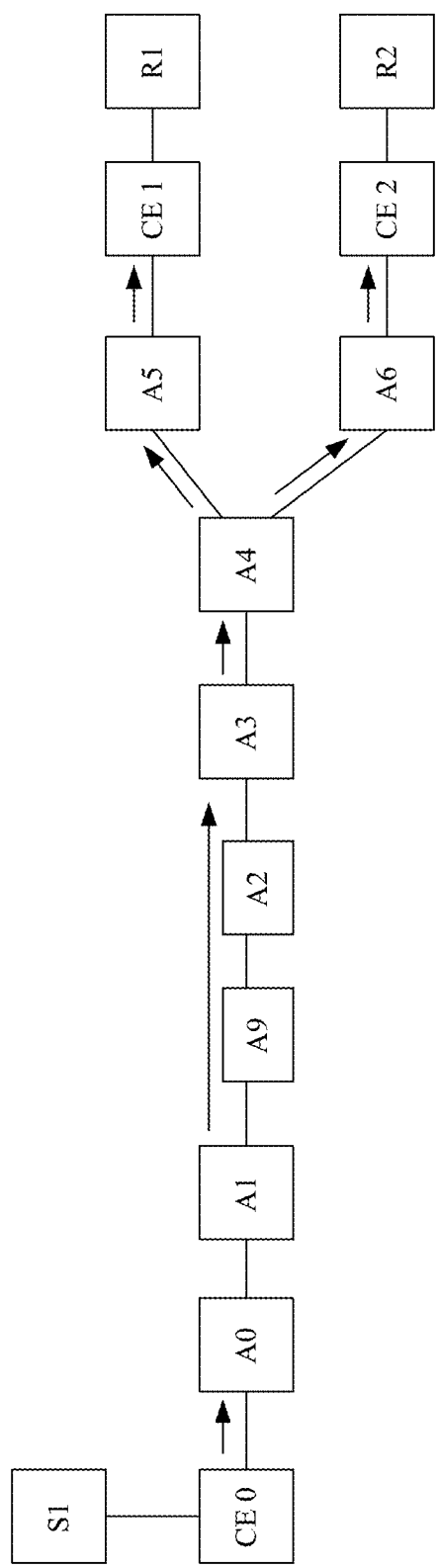
FIG. 1 is a schematic diagram of a network scenario according to Embodiment 1 of this application.
Figure 2A:
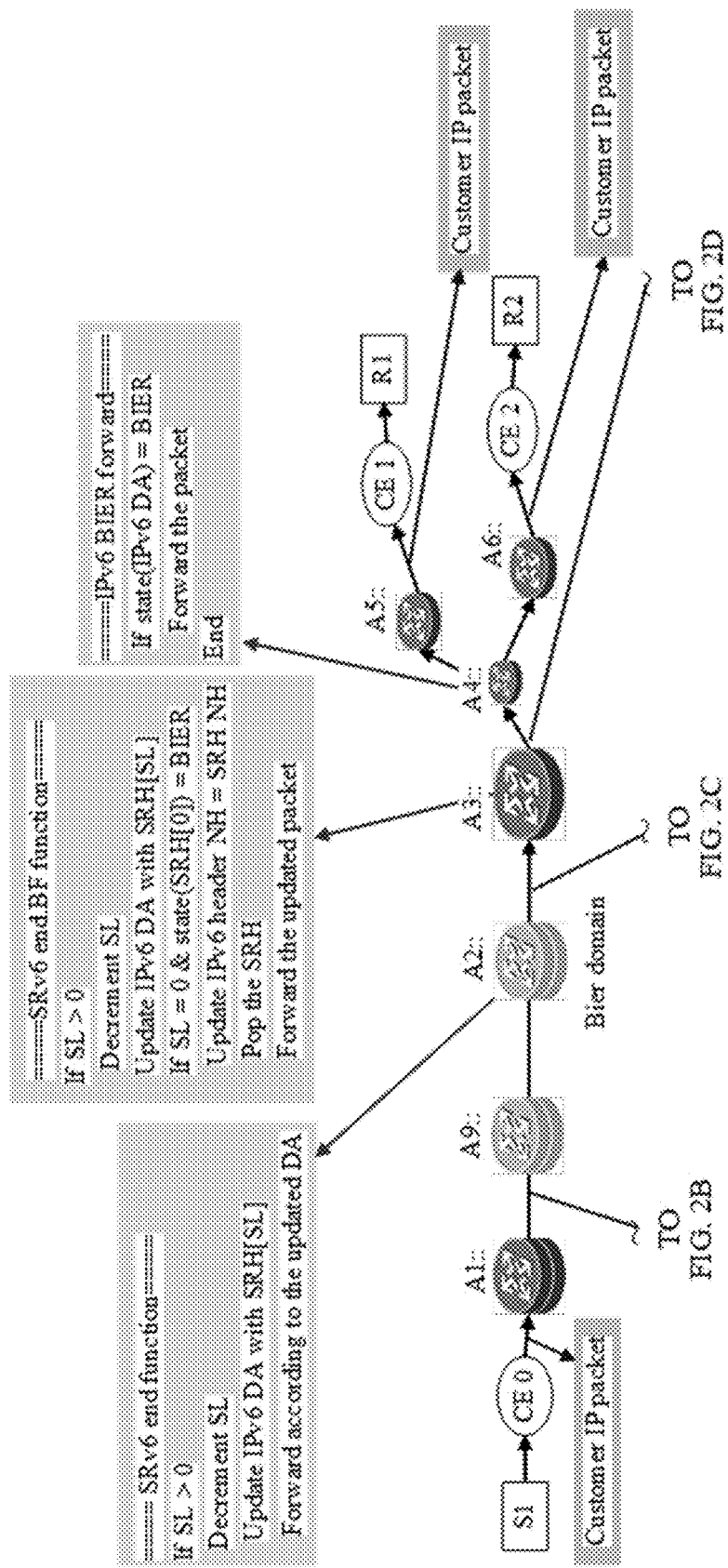
FIG. 2A to FIG. 2D are a schematic diagram of another network scenario according to Embodiment 1 of this application.
Figure 2B:
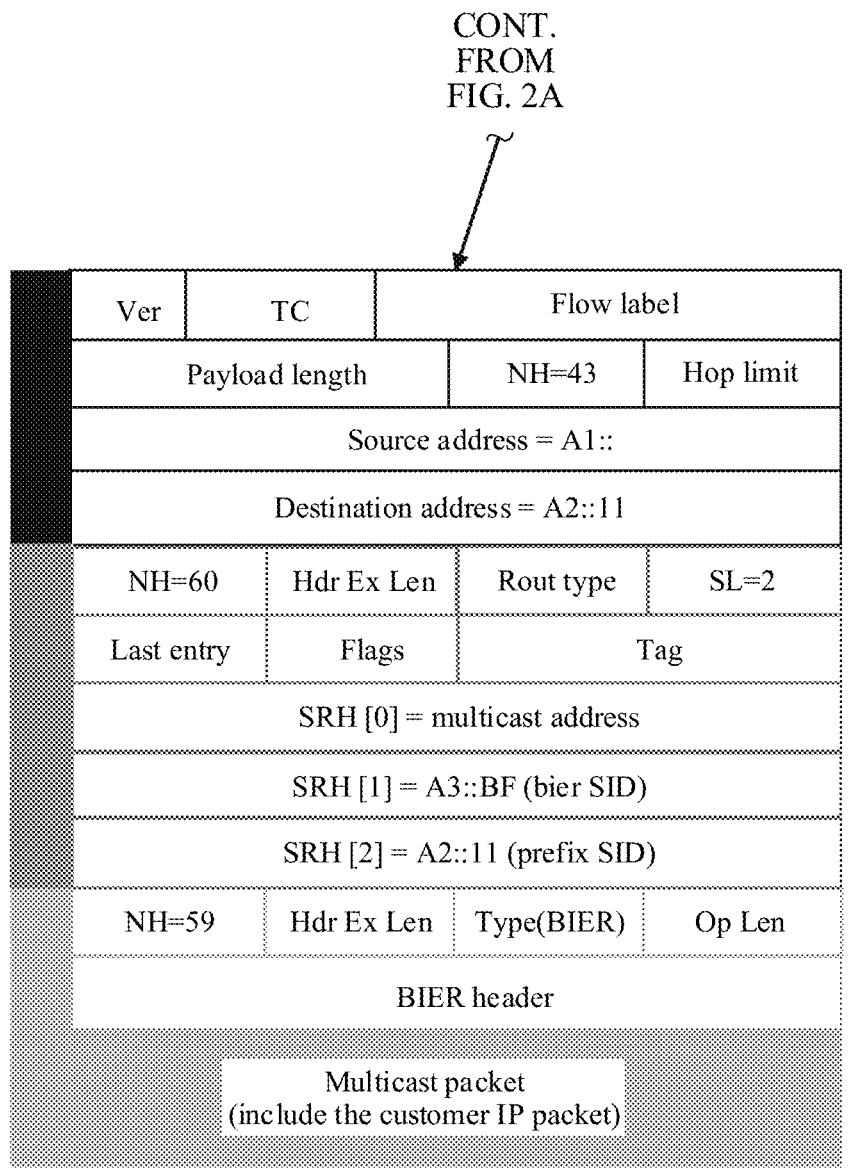
Figure 2C:
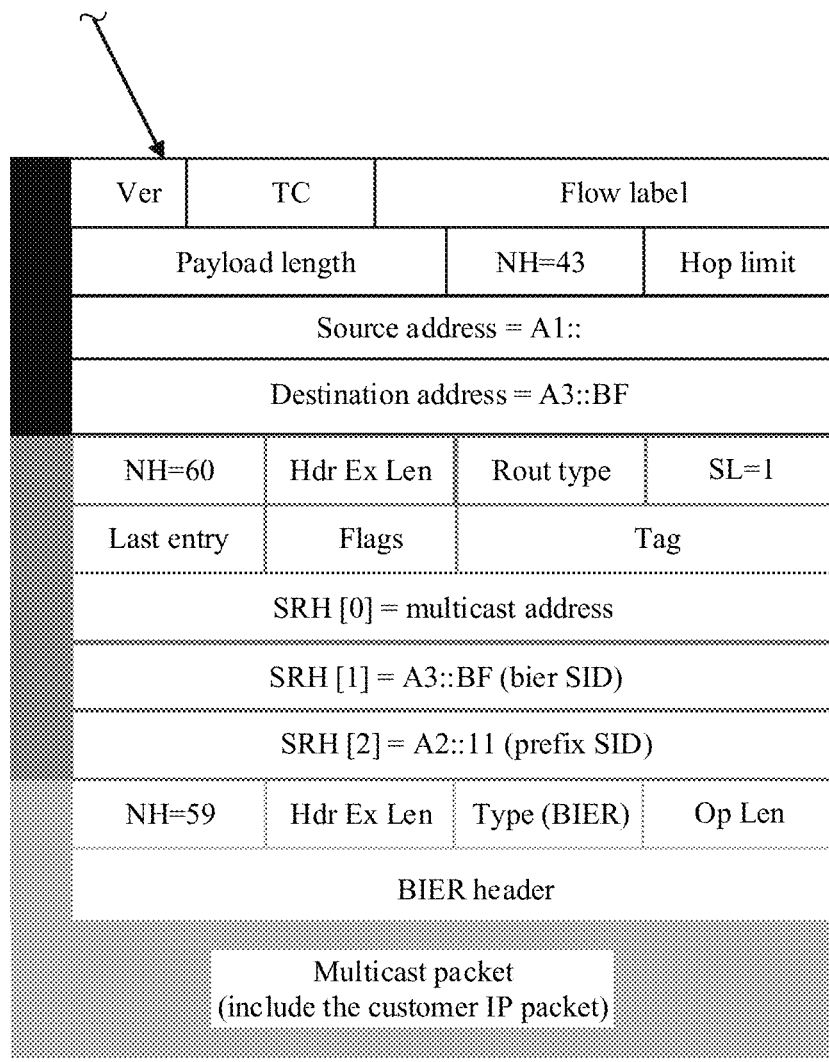
Figures 2A, 2D:
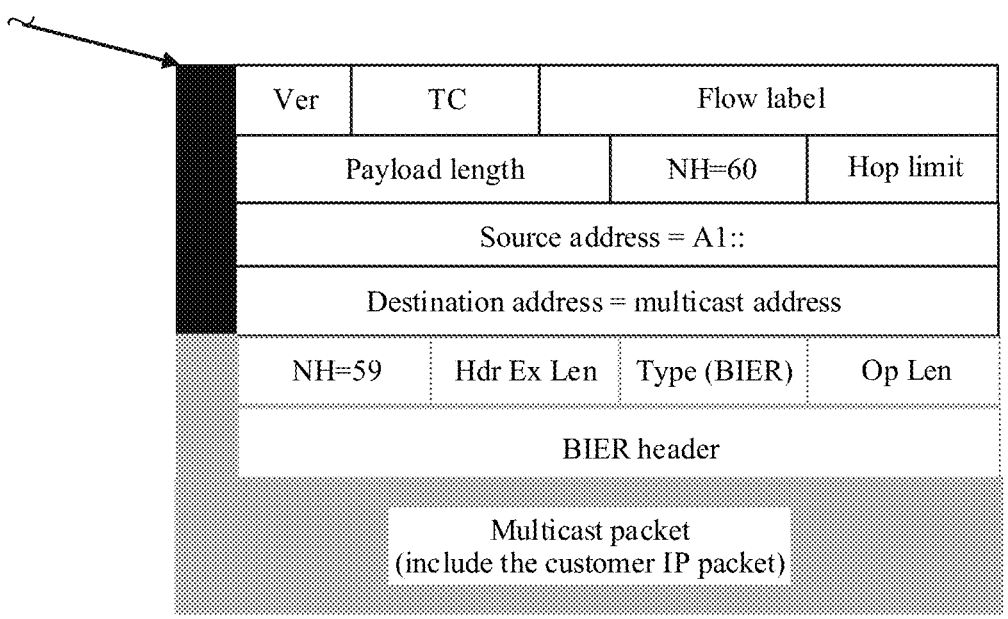

In the scenario shown in FIG. 2A to FIG. 2D, when A1 is the root node, A1 receives a multicast data packet, for example, a customer internet protocol packet (customer IP packet) in FIG. 1, sent by a multicast source (S1 in FIG. 2A to FIG. 2D) through a customer edge device (CE 0 in FIG. 2A to FIG. 2D). A1 may learn, according to a setting, that the customer internet protocol packet needs to be sent to A5 and A6. A1 may encapsulate a first packet header, a second packet header, and a third packet header layer by layer on the received customer internet protocol packet, to obtain a first multicast data packet. In a structure of the first multicast data packet, the third packet header is at an outer layer of the second packet header, the second packet header is at an outer layer of the first packet header, and the first packet header is at an outer layer of the customer internet protocol packet.

Figure 3:
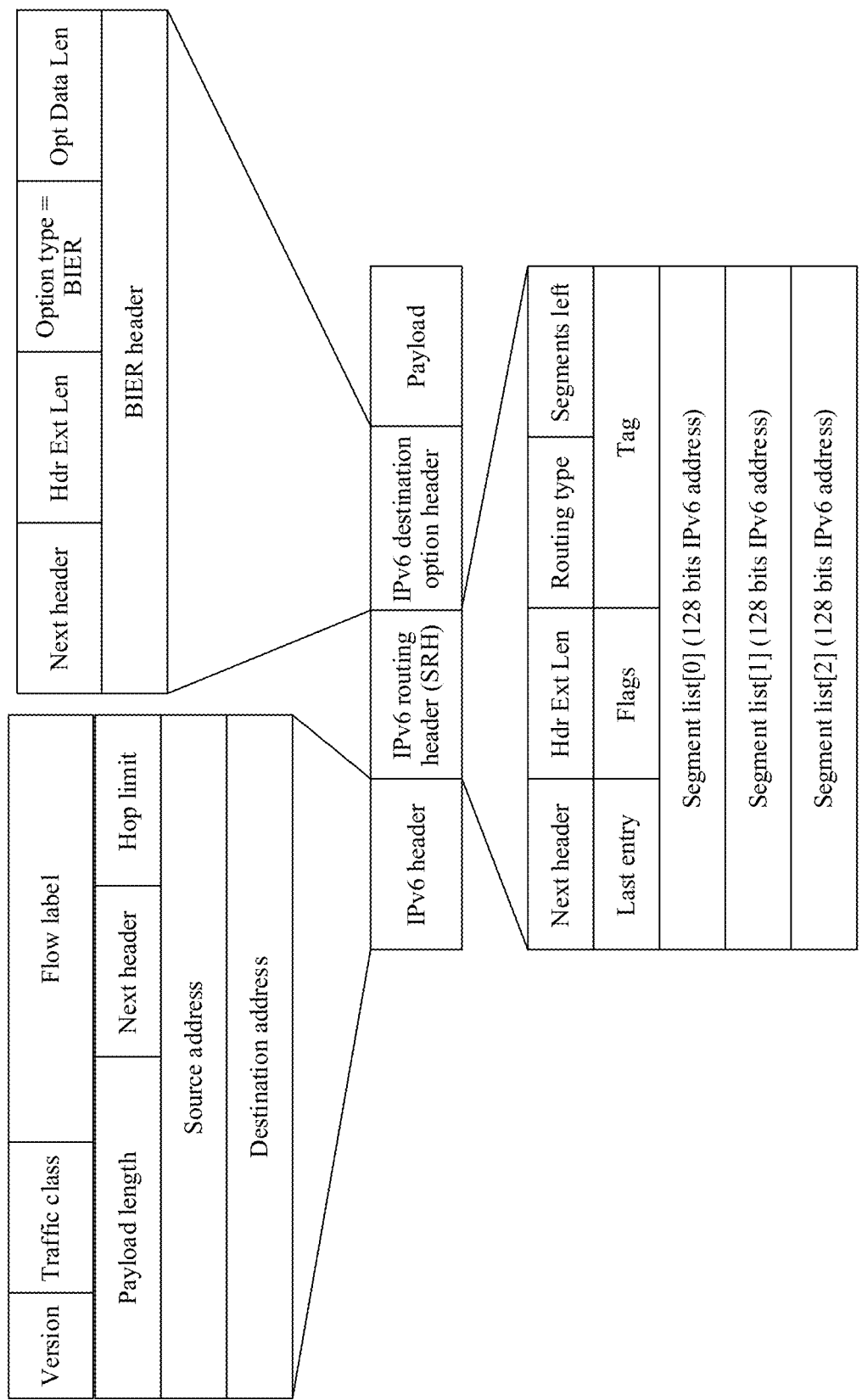
FIG. 3 is a schematic diagram of a structure of a multicast data packet according to Embodiment 1 of this application.

For example, the first packet header may be an IPv6 destination option header in FIG. 3. The first packet header includes a TLV. A Type value of the TLV indicates that content of the TLV includes a BIER header. A Value part of the TLV includes the entire BIER header. The Type value of the TLV in the first packet is carried in an option type field in FIG. 3. The Value part of the TLV in the first packet header is carried in a BIER header field in FIG. 3. The BIER header in FIG. 3 includes a bit string, and the bit string is used to identify A5 and A6. The bit string indicates that a multicast data packet carrying the bit string needs to be routed to A5 and A6. In addition, a value of a next header (NH) field in the first packet header is 59. The value of the NH field is used to identify that no other extension header is carried after the first packet header. In other words, the multicast data packet (for example, the customer IP packet in FIG. 1) is after the first packet header.

For example, the second packet header is an SRH in FIG. 3. The SRH includes three SIDs, and any one of the SIDs is an IPv6 address with 128 bits. The SIDs may be carried in segment list (SL) fields in FIG. 3. SRH[2] in FIG. 2A to FIG. 2D is Segment List[2] in FIG. 3. SRH[1] in FIG. 2A to FIG. 2D is Segment List[1] in FIG. 3. SRH[0] in FIG. 2A to FIG. 2D is Segment List[0] in FIG. 3. An SL in FIG. 2A to FIG. 2D is a segment left field in FIG. 3. According to the setting and a flooded SID of each node, A1 determines that the multicast data packet passes through A2 and that an end of a SRH-based tunnel is A3. A1 writes the multicast address indicating the BIER information into the SRH[0] (a last segment of the SRH) in the second packet header. If A1 determines that the end of the SRH-based tunnel is A3, A1 writes an SID of A3 into the SRH[1] (a penultimate segment of the SRH) in the second packet header. The SID of A3 may be an IP address on the A3 node. The IP address on the A3 node instructs the A3 node to process the segment and a segment, an SRH, and an IPv6 Destination Option Header of a following multicast address. As shown in FIG. 2A to FIG. 2D, the IP address on the A3 node may be represented as A3::BF. If A1 determines that the SRH-based tunnel needs to pass through A2, a prefix SID of A2 is written into the SRH[2] in the second packet header. The prefix SID of A2 may be represented as A2::11. The prefix SID of A2 may be replaced with an SID of A2 in another form. This is not limited in this embodiment of this application. A1 assigns a value of 2 to the second packet header (the SL in FIG. 2A to FIG. 2D), to indicate that the segment is the SRH[2]. A route type in the second packet header is assigned a value representing the SRH. For example, the route type may be assigned a value of 4. A value of an NH field in the second packet header is 60. The value of the NH field is used to identify the first packet header follows the second packet header, namely, the IPv6 destination option header in FIG. 3.

For example, the third packet header is an IPv6 header in FIG. 3. A1 uses an address corresponding to an SRH specified by a value of an SL in the third packet header, namely, the SID of A2 in the SRH[2] field in FIG. 2A to FIG. 2D, as a destination address (DA) in the IPv6 header. A1 sets a source address (SA) in the third packet header as an address of A1. A value of an NH field in the third packet header is 43. The value of the NH field is used to identify that an IPv6 routing header follows the third packet header. The second packet header in this embodiment of this application is a specific instance of the IPv6 routing header. To be specific, the SRH in FIG. 3 is a subtype of the IPv6 routing header.

A1 sends the first multicast data packet to A9. After receiving the first multicast data packet, A9 determines that a destination address in the third packet header is not A9, and does not check any other IPv6 extension headers. A9 does not process the received first multicast data packet, and sends the first multicast data packet to a device (A2 in FIG. 2A to FIG. 2D) identified by the destination address.

After receiving the first multicast data packet, A2 determines that the destination address in the third packet header is A2. A parameter carried in the destination address in the third packet header indicates an SRv6 segment on A2. A2 starts a first SRv6 end function (for example, an SRv6 end function in FIG. 2A to FIG. 2D) based on the indication and the first multicast data packet, to obtain a second multicast data packet. As shown in FIG. 2A to FIG. 2D, when a value of an SL in the SRH is greater than 0, A2 uses a value obtained by subtracting 1 from the value of the SL as a value of an SL in an SRH of the second multicast data packet. As shown in FIG. 2A to FIG. 2D, the SL in the second multicast data packet is 1. A2 uses an address in an SRH field corresponding to SL=1 as a destination address in a third packet header of the second multicast data packet. As shown in FIG. 2A to FIG. 2D, A2 writes an address of A3 in the SRH[1] into a Destination Address of the second multicast data packet. A2 performs forwarding based on the Destination Address in the second multicast data packet.

Figure 4:
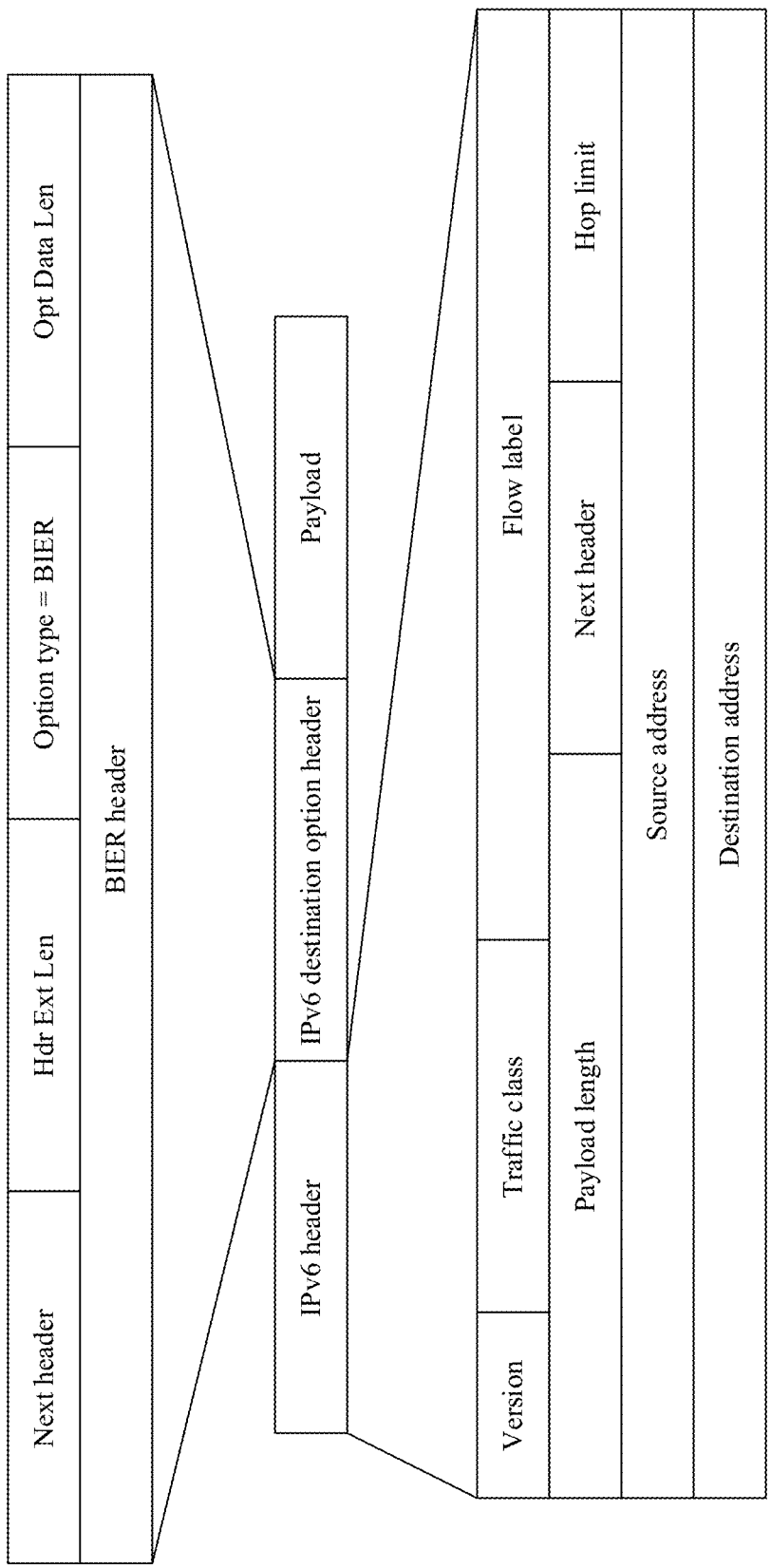
FIG. 4 is a schematic diagram of a structure of another multicast data packet according to Embodiment 1 of this application.
Figure 5:
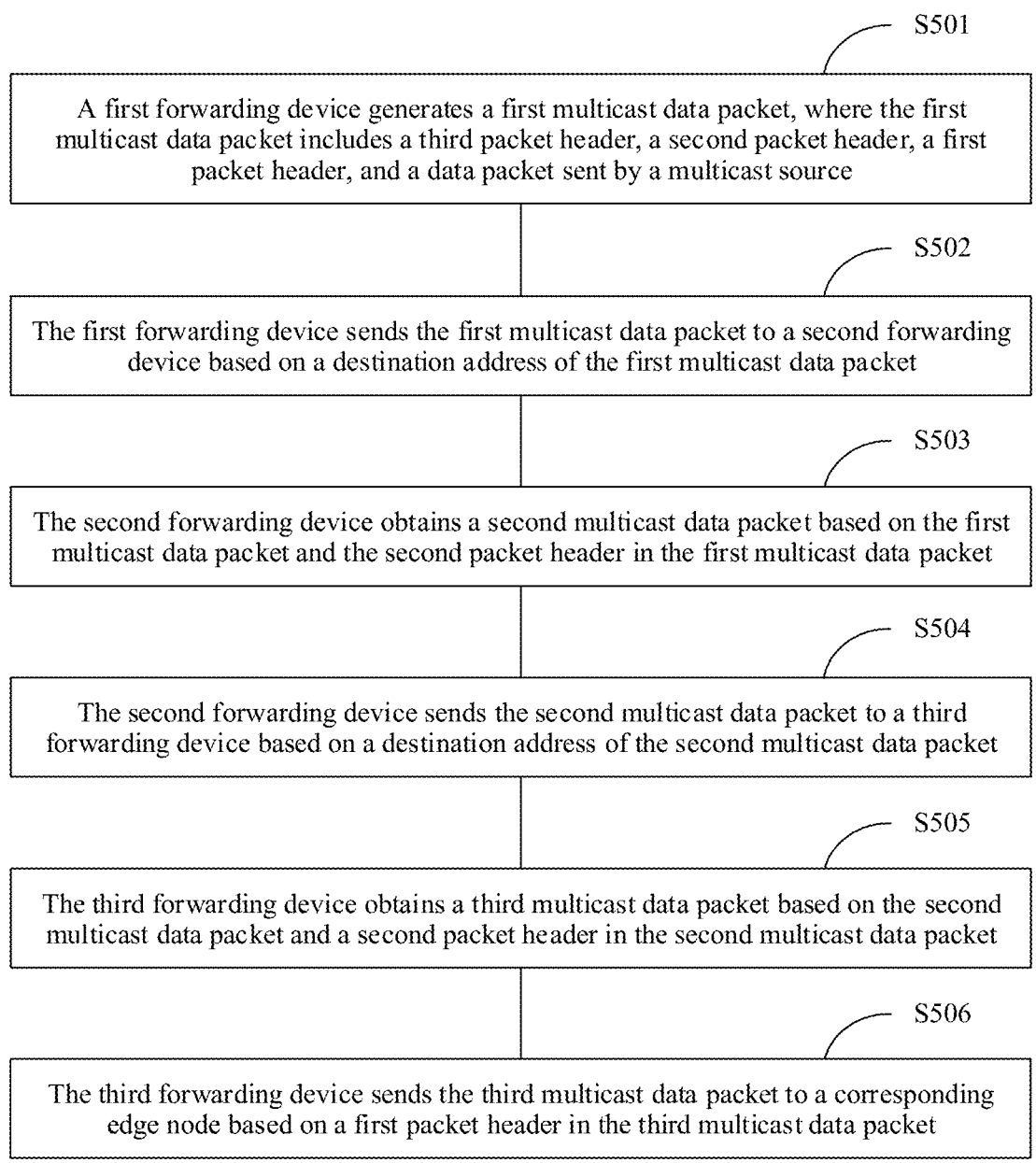
FIG. 5 is a schematic flowchart of a multicast data packet processing method according to Embodiment 1 of this application.

After receiving the second multicast data packet, A3 determines that the destination address in the third packet header is A3. A parameter carried in the destination address in the third packet header indicates an SRv6 segment on A3. A3 starts a second SRv6 end function (for example, an SRv6 end. BF function in FIG. 2A to FIG. 2D) based on the indication and the second multicast data packet, to obtain a third multicast data packet. Processing included in the indication is: The value of the SL in the second multicast data packet is subtracted by 1 (a result obtained after subtracting 1 is 0), and a Destination Address in a third packet header of the third multicast data packet is updated to an address (the multicast address in FIG. 2A to FIG. 2D) carried in the SRH[0]. When the SL is equal to 0, the value of the NH in the third packet header is updated to a value of an NH in the SRH, and the SRH in the second multicast data packet is popped out. Through the foregoing processing, A3 obtains the third multicast data packet. The third multicast data packet does not include an SRH. In other words, the third multicast data packet includes the first packet header and the third packet header. The third packet header is encapsulated outside the first packet header, and the first packet header is encapsulated outside the customer IP packet. For details, refer to a schematic diagram of a structure of a multicast data packet shown in FIG. 4. It should be noted that the DA included in the third packet header of the third multicast data packet is a multicast address, and the multicast address indicates that content of the first packet header needs to be checked. To be specific, the multicast address in the DA field of the third multicast data packet indicates a meaning of forwarding based on the BIER. The value of the NH in the third packet header of the third multicast data packet is 60. For a specific meaning, refer to corresponding content of the second multicast data packet. A3 reads the bit string included in the BIER header of the IPv6 Destination Option Header in the packet based on an indication function of the multicast address. A3 queries a BIER forwarding table based on information in the bit string. The BIER forwarding table may include a correspondence between a bit position and a port. A3 may determine, based on information carried in the BIER header, that the third multicast data packet needs to be sent to A5 and A6, and a path to A5 and A6 needs to pass through a neighboring device, namely, A4 in FIG. 1 and FIG. 2A to FIG. 2D.

After receiving the third multicast data packet, A4 determines that the destination address of the third multicast data packet is a multicast group address. The multicast group address indicates that A4 needs to replicate and forward the third multicast data packet. A4 reads, based on the indication, the bit string included in the BIER header of the IPv6 Destination Option Header in the first packet header of the third multicast data packet. A4 queries the BIER forwarding table based on the information in the bit string, to determine a neighboring device configured to receive the third multicast data packet. Neighboring devices, of the third multicast data packet, determined by A4 include A5 and A6. A4 replicates a fourth multicast data packet to A5, and a fifth multicast data packet to A6. The fourth multicast data packet includes the first packet header and the third packet header. The fifth multicast data packet includes the first packet header and the third packet header. A bit string in the BIER header in the first packet header of the fourth multicast data packet may be different from that in the third multicast data packet. A bit string in the BIER header in the first packet header of the fifth multicast data packet may be different from that in the third multicast data packet.

A5 receives the fourth multicast data packet, and determines that a BitString in the BIER header of the IPv6 Destination Option Header in the fourth multicast data packet includes a Bit of A5. A5 pops out the third packet header and the first packet header from the fourth multicast data packet, to obtain the customer IP packet. As shown in FIG. 2A to FIG. 2D, A5 may send the customer IP packet to R1 through CE 1, so that a customer receives the customer IP packet through R1.

A6 receives the fifth multicast data packet, and determines that a BitString in the BIER header of the IPv6 Destination Option Header in the fifth multicast data packet includes a Bit of A6. A6 pops out the third packet header and the first packet header from the fifth multicast data packet, to obtain the customer IP packet. As shown in FIG. 2A to FIG. 2D, A6 may send the customer IP packet to R2 through CE 2, so that the customer receives the customer IP packet through R2.

When A1 is not the root node but any intermediate node, A1 may process the received multicast data packet according to the foregoing method for generating the first multicast data packet, to obtain the first multicast data packet. A1 may be the root node or the intermediate node. A1 is a previous-hop node of a forwarding device that does not support the BIER technology, for example, A9 and A2. The previous-hop node is a previous-hop node of a node in a direction from the root node to the leaf node. To be specific, compared with A2, A1 is a node close to the root node or the multicast source. For a parameter included in the BIER header in this embodiment of this application and a definition of the parameter, refer to RFC8296.

The multicast data packet is transmitted between A1 and A3 through the SRH-based tunnel. The multicast data packet is transmitted between A3 and A5 through the BIER technology. The multicast data packet is transmitted between A3 and A6 through the BIER technology. The following describes, with reference to FIG. 1 to FIG. 5, a multicast data packet processing procedure provided in Embodiment 1 of this application.

S501: A first forwarding device generates a first multicast data packet, where the first multicast data packet includes a third packet header, a second packet header, a first packet header, and a data packet sent by a multicast source.

For example, the first forwarding device is A1 in FIG. 1 or FIG. 2A to FIG. 2D. For the first multicast data packet, the third packet header, the second packet header, and the first packet header, refer to corresponding descriptions in the embodiments corresponding to FIG. 1 to FIG. 4. The data packet sent by the multicast source may be the customer IP packet in the embodiments corresponding to FIG. 1 to FIG. 4. For generating the first multicast data packet by the first forwarding device, refer to the method for obtaining the first multicast data packet by A1 in the embodiments corresponding to FIG. 1 to FIG. 4.

S502: The first forwarding device sends the first multicast data packet to a second forwarding device based on a destination address of the first multicast data packet.

For a method for sending the first multicast data packet to the second forwarding device by the first forwarding device, refer to the method for sending the first multicast data packet to A2 by A1 in the embodiments corresponding to FIG. 1 to FIG. 4.

S503: The second forwarding device obtains a second multicast data packet based on the first multicast data packet and the second packet header in the first multicast data packet.

For a method for obtaining the second multicast data packet by the second forwarding device, refer to the method for obtaining the second multicast data packet by A2 in the embodiments corresponding to FIG. 1 to FIG. 4. For parameters included in the second multicast data packet and meanings of the parameters, refer to the embodiments corresponding to FIG. 1 to FIG. 4.

S504: The second forwarding device sends the second multicast data packet to a third forwarding device based on a destination address of the second multicast data packet.

For a method for sending the second multicast data packet to the third forwarding device by the second forwarding device, refer to the method for sending the second multicast data packet to A3 by A2 in the embodiments corresponding to FIG. 1 to FIG. 4.

S505: The third forwarding device obtains a third multicast data packet based on the second multicast data packet and a second packet header in the second multicast data packet.

For a method for obtaining the third multicast data packet by the third forwarding device, refer to the method for obtaining the third multicast data packet by A3 in the embodiments corresponding to FIG. 1 to FIG. 4. For parameters included in the third multicast data packet and meanings of the parameters, refer to the embodiments corresponding to FIG. 1 to FIG. 4.

S506: The third forwarding device sends the third multicast data packet to a corresponding edge node based on a first packet header in the third multicast data packet.

For a method for sending the third multicast data packet to the corresponding edge node by the third forwarding device, refer to the method for sending the corresponding multicast data packets to A5 and A6 by A3 through A4 in the embodiments corresponding to FIG. 1 to FIG. 4.

In the method provided in Embodiment 1 of this application, a forwarding device in an IPv6 network may perform BIER-based multicast replication without upgrading the device, for example, without upgrading the forwarding device to a forwarding device that supports the BIER technology. This helps reduce deployment costs and deployment difficulty. The forwarding device in the IPv6 network complies with an extension mode recommended by an IPv6 protocol. No IPv6 extension header type needs to be added. Instead, only a TLV needs to be extended on a common type of IPv6 extension header (for example, an IPv6 Destination Option Header with Type=60). Further, when there is a forwarding device that does not support the BIER in a network that supports a BIER IPv6, for example, the second forwarding device does not support the BIER technology, according to the method provided in Embodiment 1 of this application, an SRH-based tunnel is established between the first forwarding device and the third forwarding device, to implement BIER IPv6 deployment and BIER-based multicast data packet forwarding.

Specifically, according to the method provided in Embodiment 1 of this application, an IPv6 Destination Option Header is used to encapsulate a BIER header, and a multicast address is used as a destination address of an IPv6 header, to indicate to perform multicast replication and forwarding on a multicast data packet based on the BIER header in the IPv6 Destination Option Header, so that a multicast BIER is replicated and forwarded in the IPv6 network. This supports running and deployment of the BIER on a plurality of links. As long as these links support the IPv6, deployment can be performed according to the method of the present invention. Further, according to the method provided in Embodiment 1 of this application, a new Segment type (or an SID type), namely, an SID corresponding to A3, is defined. The SID indicates processing the Segment and a Segment of a subsequent multicast address, an entire SRH header, and the IPv6 Destination Option Header following the SRH header, popping out the SRH header, and performing BIER forwarding.

Embodiment 2

Figure 6:
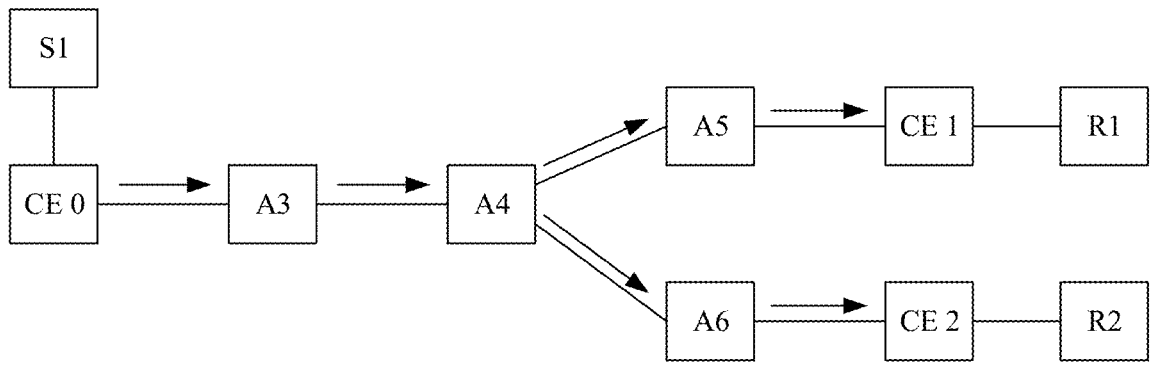
FIG. 6 is a schematic diagram of a network scenario according to Embodiment 2 of this application.

FIG. 6 is a schematic diagram of a network scenario according to Embodiment 2 of this application. A difference between the network scenario provided in Embodiment 2 and the network scenario provided in Embodiment 1 lies in that in the network scenario provided in Embodiment 2, A3 is connected to CE 0, and A1, A9, and A2 in Embodiment 1 are omitted. In the network scenario provided in Embodiment 2, A3 may receive a customer IP packet sent by a multicast source S1 through CE 0. For specific content of S1, CE 0, and the customer IP packet, refer to corresponding content in Embodiment 1. A3 may encapsulate a first packet header and a second packet header in the customer IP packet, to obtain a first multicast data packet. For parameters included in the first multicast data packet in the second embodiment and meanings of the parameters, refer to corresponding content of the third multicast data packet in Embodiment 1. For parameters included in the first packet header in the second embodiment and meanings of the parameters, refer to corresponding content of the first packet header in Embodiment 1. For parameters included in the second packet header in the second embodiment and meanings of the parameters, refer to corresponding content of the third packet header in Embodiment 1. For content of multicast data packets sent by A3 to A5 and A6 through A4 in Embodiment 2, refer to corresponding content of the third multicast data packet sent by A3 in Embodiment 1. For a method for processing the first multicast data packet by A4 in Embodiment 2, refer to corresponding content of processing the third multicast data packet by A4 in Embodiment 1. For a method for processing a second multicast data packet by A5 in Embodiment 2, refer to the method for processing the fourth multicast data packet by A5 in Embodiment 1. For a method for processing a third multicast data packet by A6 in Embodiment 2, refer to the method for processing the fifth multicast data packet by A6 in Embodiment 1.

Figure 7:
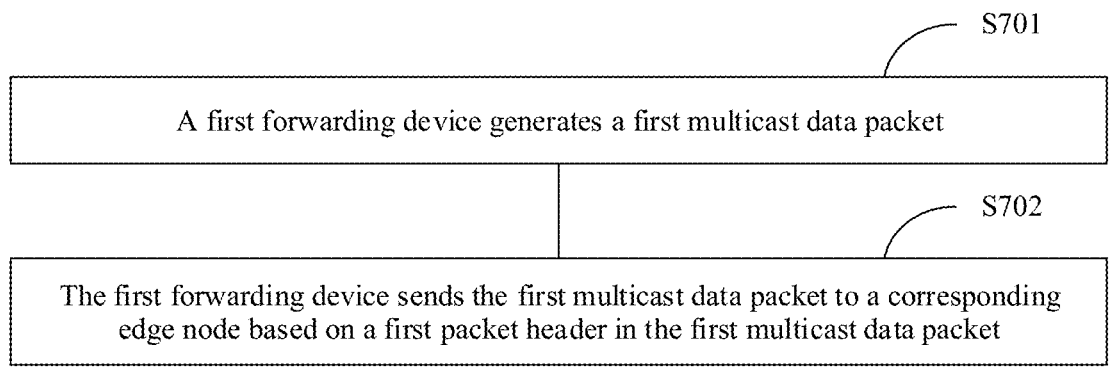
FIG. 7 is a schematic flowchart of a multicast data packet processing method according to Embodiment 2 of this application.

The following describes, with reference to FIG. 6 and FIG. 7, a multicast data packet processing method provided in Embodiment 2 of this application.

S701: A first forwarding device generates a first multicast data packet.

The first forwarding device is A3 in FIG. 1 to FIG. 6. For a method for generating the first multicast data packet by the first forwarding device, refer to the method for generating the first multicast data packet by A3 in FIG. 6. For specific content of the first multicast data packet in the second embodiment, refer to the third multicast data packet in Embodiment 1.

S702: The first forwarding device sends the first multicast data packet to a corresponding edge node based on a first packet header in the first multicast data packet.

For a method for sending the first multicast data packet to the corresponding edge node by the first forwarding device, refer to a method for sending the multicast data packets to A5 and A6 by A3 through A4 in FIG. 6.

A method provided in Embodiment 3 of this application is an improvement made on the method provided in Embodiment 1. In the method provided in Embodiment 3 of this application, a first multicast data packet generated by A1 may not include a first packet header. In other words, the first multicast data packet generated by A1 may not include an IPv6 destination option header. When generating a third multicast data packet, A3 pops up a second packet header and adds the first packet header. In other words, the third multicast data packet generated by A1 does not include an SRH header, but includes the IPv6 destination option header. A method for generating the corresponding multicast data packets by A1 and A3 may be obtained by combining and modifying content in Embodiment 1 and Embodiment 2. Details are not described herein again.

Figure 8:
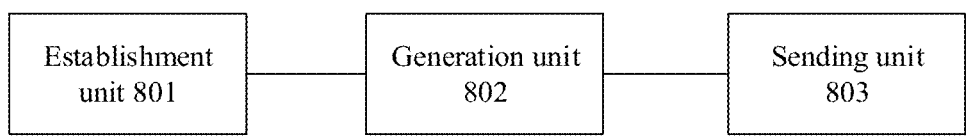
FIG. 8 is a schematic diagram of a structure of a first forwarding device according to Embodiment 1 of this application.

The following describes, with reference to FIG. 8, a structure of the first forwarding device provided in Embodiment 1 of this application. The first forwarding device may be A1 mentioned in FIG. 1 to FIG. 6. The first forwarding device includes an establishment unit 801, a generation unit 802, and a sending unit 803. The establishment unit 801 is configured to establish a segment routing header SRH-based tunnel with a third forwarding device. The SRH-based tunnel passes through a second forwarding device that does not support bit index explicit replication BIER. The generation unit 802 is configured to generate a first multicast data packet based on a multicast data packet from a multicast source and the SRH-based tunnel. The first multicast data packet includes a first packet header, a second packet header, and the multicast data packet from the multicast source. The first packet header includes an SRH header. A destination address included in the second packet header is an address of the second forwarding device. The sending unit 803 is configured to send the first multicast data packet to the second forwarding device through the SRH-based tunnel.

Optionally, the first multicast data packet further includes a third packet header. The third packet header is encapsulated between the first packet header and the multicast data packet from the multicast source and includes a BIER header. The BIER header includes a bit string. The bit string is used to indicate an edge node that receives the multicast data packet from the multicast source.

Optionally, the SRH header includes a segment left SL, a first segment list, a second segment list, and a third segment list. A value of the SL is 2. The first segment list (SRH[0]) carries a multicast address. The second segment list (SRH[1]) carries an address of the third forwarding device. The third segment list (SRH[2]) carries the address of the second forwarding device.

For example, the generation unit 802 is specifically configured to: write an obtained multicast address into the first segment list, and write the address, carried in the third segment list (SRH[2]), of the second forwarding device into the destination address of the second packet header, to generate the first multicast data packet.

Figure 9:
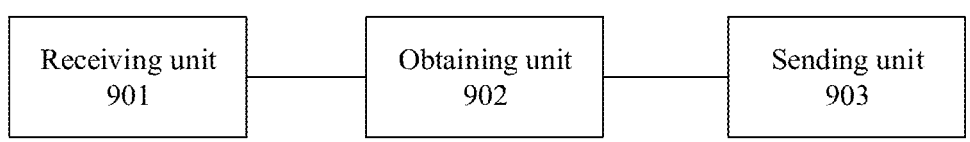
FIG. 9 is a schematic diagram of a structure of a second forwarding device according to Embodiment 1 of this application.

The following describes, with reference to FIG. 9, a structure of the second forwarding device provided in Embodiment 1 of this application. The second forwarding device is A2 mentioned in FIG. 1 to FIG. 6. The second forwarding device includes a receiving unit 901, an obtaining unit 902, and a sending unit 903. The receiving unit 901 is configured to receive a first multicast data packet sent by a first forwarding device. The first multicast data packet includes a first packet header, a second packet header, and a multicast data packet from a multicast source. The first packet header includes an SRH header. A destination address included in the second packet header is an address of the second forwarding device. The obtaining unit 902 is configured to obtain a second multicast data packet based on the first multicast data packet and the destination address included in the first multicast data packet. The second multicast data packet includes a third packet header, a fourth packet header, and the multicast data packet from the multicast source. The third packet header is an SRH header different from the first packet header. A destination address included in the fourth packet header is an address of a third forwarding device. The sending unit 903 is configured to send the second multicast data packet to the third forwarding device based on the destination address included in the fourth packet header.

Optionally, the second multicast data packet further includes a fifth packet header. The fifth packet header is encapsulated between the third packet header and the multicast data packet from the multicast source. The fifth packet header includes a BIER header. The BIER header includes a bit string. The bit string is used to indicate an edge node that receives the multicast data packet from the multicast source.

Optionally, the SRH header includes a segment left SL, a first segment list, a second segment list, and a third segment list. A value of the SL is 1. The first segment list (SRH[0]) carries a multicast address. The second segment list (SRH[1]) carries the address of the third forwarding device. The third segment list (SRH[2]) carries the address of the second forwarding device.

For example, the obtaining unit 902 is specifically configured to: obtain the third packet header after subtracting 1 from a value of an SL in the first packet header; obtain the fourth packet header by replacing, based on the value of the SL in the third packet header, the destination address of the second packet header with a parameter carried in the second segment list of the third packet header; and obtain the second multicast data packet based on the third packet header, the fourth packet header, and the multicast data packet from the multicast source.

Figure 10:
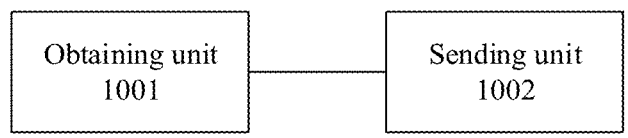
FIG. 10 is a schematic diagram of a structure of a third forwarding device according to Embodiment 1 of this application.

The following describes, with reference to FIG. 10, a structure of the third forwarding device provided in Embodiment 1. The third forwarding device is A3 mentioned in FIG. 1 to FIG. 7. The third forwarding device includes an obtaining unit 1001 and a sending unit 1002. The obtaining unit 1001 is configured to obtain a second multicast data packet based on a first multicast data packet. The first multicast data packet is a multicast data packet from a multicast source, or a multicast data packet from a second forwarding device that does not support BIER. The second multicast data packet includes a bit string. The sending unit 1002 is configured to send the second multicast data packet to a corresponding edge node based on the bit string.

Optionally, the multicast data packet from the second forwarding device that does not support the BIER includes a first packet header, a second packet header, and the multicast data packet from the multicast source. The first packet header includes an SRH header. A destination address of the second packet header is an address of the first forwarding device.

Optionally, a destination address of the second multicast data packet is a multicast address. The multicast address is used to instruct the first forwarding device to perform forwarding based on the bit string.

Figure 11:
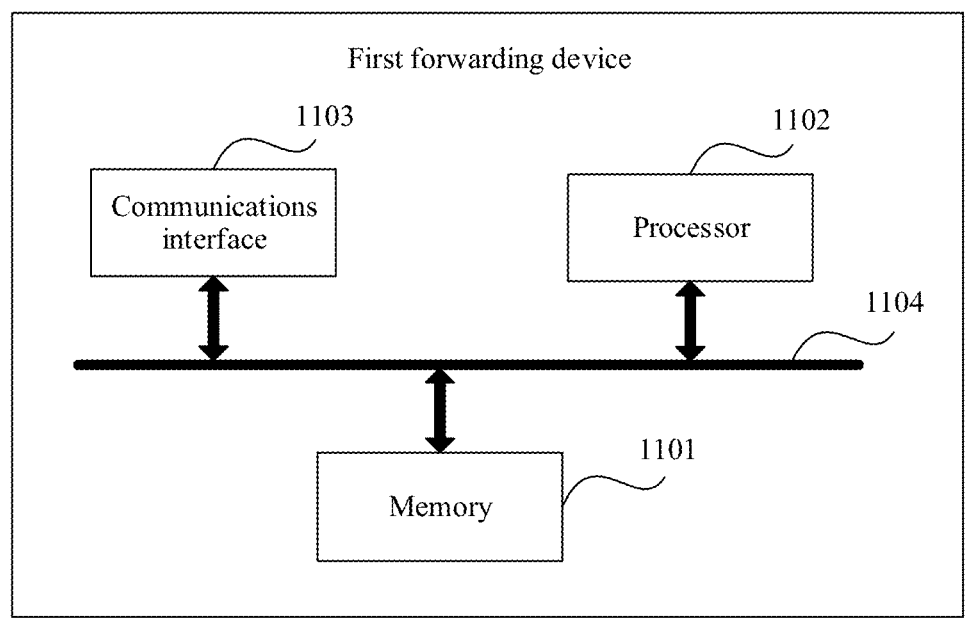
FIG. 11 is a schematic diagram of a structure of a first forwarding device according to Embodiment 2 of this application.
Figure 12:
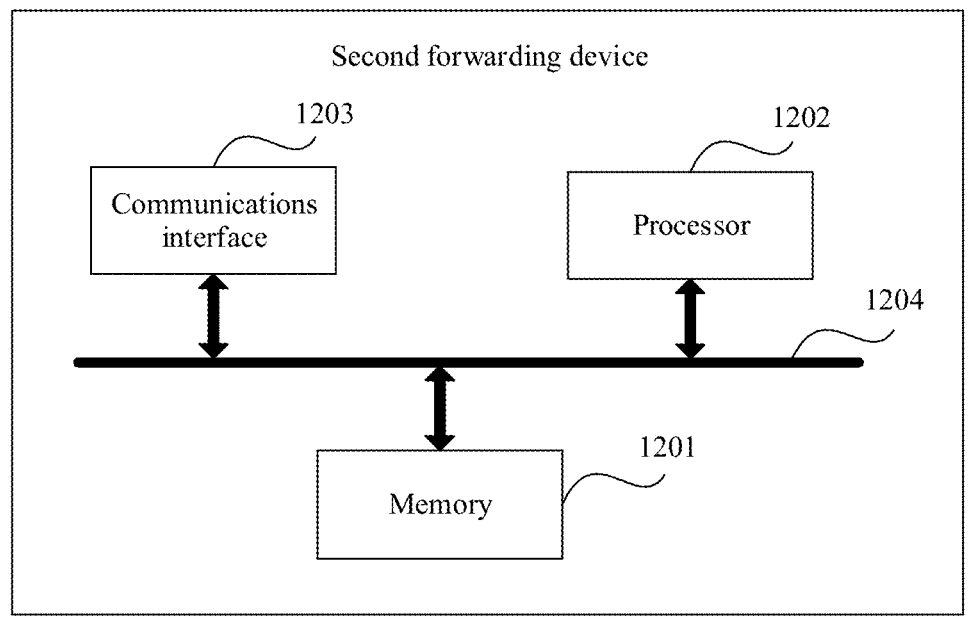
FIG. 12 is a schematic diagram of a structure of a second forwarding device according to Embodiment 2 of this application.
Figure 13:
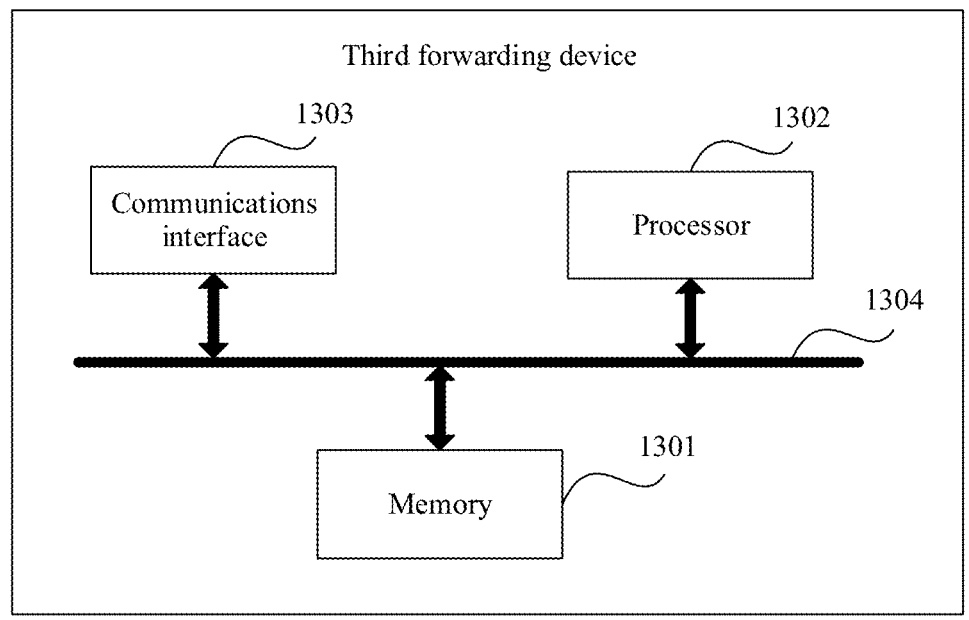
FIG. 13 is a schematic diagram of a structure of a third forwarding device according to Embodiment 2 of this application.

FIG. 11 to FIG. 13 separately describe structures of the first forwarding device, the second forwarding device, and the third forwarding device from a perspective of a hardware structure. As shown in FIG. 11, the first forwarding device includes a memory 1101, a processor 1102, a communications interface 1103, and a bus 1104. The processor 1102 is configured to read a program instruction from the memory 1101, to perform the method performed by A1 in Embodiment 1. As shown in FIG. 12, the second forwarding device includes a memory 1201, a processor 1202, a communications interface 1203, and a bus 1204. The processor 1202 is configured to read a program instruction from the memory 1201, to perform the method performed by A2 in Embodiment 1. As shown in FIG. 13, the third forwarding device includes a memory 1301, a processor 1302, a communications interface 1303, and a bus 1304. The processor 1302 is configured to read a program instruction from the memory 1301, to perform the method performed by A3 in Embodiment 1 or Embodiment 2.

The processor may be a central processing unit, a general-purpose processor, a digital signal processor, an application-specific integrated circuit, a field programmable gate array or another programmable logical device, a transistor logical device, a hardware component, or any combination thereof. The processor may implement or execute various example logical blocks, modules, and circuits described with reference to content disclosed in this application. Alternatively, the processor may be a combination implementing a computing function, for example, a combination of one or more microprocessors, or a combination of a digital signal processor and a microprocessor. The bus may be a peripheral component interconnect (PCI) bus, an extended industry standard architecture (EISA) bus, or the like. The bus may be classified into an address bus, a data bus, a control bus, and the like. For ease of representation, only one thick line is used to represent the bus in FIG. 11 to FIG. 13, but this does not mean that there is only one bus or only one type of bus.

The general-purpose processor mentioned in the embodiments of this application may be a microprocessor, or the processor may be any conventional processor. The steps of the methods disclosed with reference to the embodiments of the present invention may be directly performed by a combination of hardware and software modules in the processor. When the functions are implemented by software, code that implements the foregoing functions may be stored in a computer-readable medium. The computer-readable medium includes a computer storage medium. The storage medium may be any available medium accessible to a computer. The following is used as an example but is not limited: The computer readable medium may be a random access memory (RAM), a read-only memory (ROM), an electrically erasable programmable read-only memory (EEPROM), a compact disc read-only memory (CD-ROM) or another compact disc storage, a magnetic disc storage medium or another magnetic storage device, or any other medium that can be used to carry or store expected program code in an instruction or data structure form and can be accessed by a computer. The computer-readable medium may be a compact disc (CD), a laser disc, a digital video disc (DVD), a floppy disc, or a Blu-ray disc.

The embodiments in this specification are all described in a progressive manner. For same or similar parts in the embodiments, refer to these embodiments, and each embodiment focuses on a difference from another embodiment. Especially, a system embodiment is basically similar to a method embodiment, and therefore is described briefly. For related parts, refer to partial descriptions in the method embodiment.

What is claimed is:

1. A multicast data packet processing method comprising:
    establishing, by a first forwarding device, a segment routing header (SRH)-based tunnel with a third forwarding device supporting bit index explicit replication (BIER) protocol,
        wherein the SRH-based tunnel passes through a second forwarding device that does not support BIER protocol;
    generating, by the first forwarding device, a first multicast data packet based on a multicast data packet from a multicast source and the SRH-based tunnel,
        wherein the first multicast data packet comprises a first packet header, a second packet header, and the multicast data packet from the multicast source,
        wherein the first packet header comprises an SRH comprising a multicast address of the multicast data packet, an address of the second forwarding device and an address of the third forwarding device, and
        wherein a destination address comprised in the second packet header is the address of the second forwarding device; and
    sending, by the first forwarding device, the first multicast data packet to the second forwarding device through the SRH-based tunnel based on the second packet header.

2. The method according to claim 1, wherein the first multicast data packet further comprises a third packet header which is encapsulated between the first packet header and the multicast data packet from the multicast source and comprises a BIER header, wherein the BIER header comprises a bit string which indicates an edge node that receives the multicast data packet from the multicast source.

3. The method according to claim 1, wherein the SRH comprises a segment list carrying the multicast address of the multicast data packet, a segment list carrying the address of the third forwarding device and a segment list carrying the address of the second forwarding device.

4. The method according to claim 3, wherein generating the first multicast data packet based on the multicast data packet comprises:
    writing, by the first forwarding device, the multicast address of the multicast data packet into the segment list of the SRH; and
    writing, by the first forwarding device, the address of the second forwarding device carried in the segment list of the SRH into the destination address of the second packet header to generate the first multicast data packet.

5. A multicast data packet processing method comprising:
    receiving, by a second forwarding device, a first multicast data packet sent by a first forwarding device,
        wherein the first multicast data packet comprises a first packet header, a second packet header, and a multicast data packet from a multicast source,
        wherein the first packet header comprises a segment routing header (SRH),
        wherein the SRH comprises a multicast address of the multicast data packet, an address of the second forwarding device and an address of the third forwarding device, and
        wherein a destination address comprised in the second packet header is an address of the second forwarding device;
    obtaining, by the second forwarding device, a second multicast data packet based on the first multicast data packet and the destination address comprised in the first multicast data packet,
        wherein the second multicast data packet comprises a third packet header, a fourth packet header, and the multicast data packet from the multicast source,
        wherein the third packet header is an SRH different from the SRH comprised in the first packet header, and
        wherein a destination address comprised in the fourth packet header is the address of a third forwarding device; and
    sending, by the second forwarding device, the second multicast data packet to the third forwarding device based on the destination address comprised in the fourth packet header.

6. The method according to claim 5, wherein the second multicast data packet further comprises a fifth packet header which is encapsulated between the third packet header and the multicast data packet from the multicast source, and comprises a bit index explicit replication (BIER) header, wherein the BIER header comprises a bit string which indicates an edge node that receives the multicast data packet from the multicast source.

7. The method according to claim 5, wherein the SRH header comprises a segment left (SL), a first segment list, a second segment list, and a third segment list; a value of the SL is 1; the first segment list carries the multicast address of the multicast data packet the second segment list carries the address of the third forwarding device, and the third segment list carries the address of the second forwarding device.

8. The method according to claim 7, wherein obtaining the second multicast data packet comprises:
    obtaining, by the second forwarding device, the third packet header after subtracting 1 from a value of an SL in the first packet header;
    obtaining, by the second forwarding device, the fourth packet header by replacing, based on the value of the SL in the third packet header, the destination address of the second packet header with a parameter carried in the second segment list of the third packet header; and
    obtaining, by the second forwarding device, the second multicast data packet based on the third packet header, the fourth packet header, and the multicast data packet from the multicast source.

9. A first forwarding device comprising:
    a processor; and
    a non-transitory computer-readable storage medium coupled to the processor and storing programming instructions for execution by the processor, wherein the programming instructions when executed instruct the processor to:
        establish a segment routing header (SRH)-based tunnel with a third forwarding device supporting bit index explicit replication (BIER) protocol, wherein the SRH-based tunnel passes through a second forwarding device that does not support BIER protocol;

generate a first multicast data packet based on a multicast data packet from a multicast source and the SRH-based tunnel, wherein the first multicast data packet comprises a first packet header, a second packet header, and the multicast data packet from the multicast source, wherein the first packet header comprises an SRH comprising a multicast address of the multicast data packet, an address of the second forwarding device and an address of the third forwarding device, and wherein a destination address comprised in the second packet header is the address of the second forwarding device; and send the first multicast data packet to the second forwarding device through the SRH-based tunnel based on the second packet header.

10. The first forwarding device according to claim 9, wherein the first multicast data packet further comprises a third packet header, the third packet header is encapsulated between the first packet header and the multicast data packet from the multicast source and comprises a BIER header, wherein the BIER header comprises a bit string which indicates an edge node that receives the multicast data packet from the multicast source.

11. The first forwarding device according to claim 9, wherein the SRH comprises a segment list carrying the multicast address of the multicast data packet, a first segment list carrying the address of the third forwarding device and a segment list carrying the address of the second forwarding device.

12. The first forwarding device according to claim 11, wherein the programming instructions further instruct the processor to:

write the multicast address of the multicast data packet into the segment list of the SRH; and write the address, carried in the segment list of the SRH of the second forwarding device, into the destination address of the second packet header to generate the first multicast data packet.

13. A second forwarding device comprising:
a processor; and
a non-transitory computer-readable storage medium coupled to the processor and storing programming instructions for execution by the processor, wherein the programming instructions when executed instruct the processor to:

receive a first multicast data packet sent by a first forwarding device, wherein the first multicast data packet comprises a first packet header, a second packet header, and a multicast data packet from a multicast source, wherein the first packet header comprises a segment routing header (SRH), wherein the SRH comprises a multicast address of the multicast data packet, an address of the second forwarding device and an address of the third forwarding device, and wherein a destination address comprised in the second packet header is an address of the second forwarding device;

obtain a second multicast data packet based on the first multicast data packet and the destination address comprised in the first multicast data packet, wherein the second multicast data packet comprises a third packet header, a fourth packet header, and the multicast data packet from the multicast source, wherein the third packet header is an SRH different from the SRH comprised the first packet header, and wherein a destination address comprised in the fourth packet header is the address of a third forwarding device; and send the second multicast data packet to the third forwarding device based on the destination address comprised in the fourth packet header.

14. The second forwarding device according to claim 13, wherein the second multicast data packet further comprises a fifth packet header which is encapsulated between the third packet header and the multicast data packet from the multicast source, and comprises a bit index explicit replication (BIER) header, wherein the BIER header comprises a bit string which indicates an edge node that receives the multicast data packet from the multicast source.

15. The second forwarding device according to claim 13, wherein the SRH header comprises a segment left (SL), a first segment list, a second segment list, and a third segment list; a value of the SL is 1; the first segment list carries the multicast address of the multicast data packet the second segment list carries the address of the third forwarding device, and the third segment list carries the address of the second forwarding device.

16. The second forwarding device according to claim 15, wherein the programming instructions further instruct the processor to:

obtain the third packet header after subtracting 1 from a value of an SL in the first packet header;

obtain the fourth packet header by replacing, based on the value of the SL in the third packet header, the destination address of the second packet header with a parameter carried in the second segment list of the third packet header; and obtain the second multicast data packet based on the third packet header, the fourth packet header, and the multicast data packet from the multicast source.

* * * * *

UNITED STATES PATENT AND TRADEMARK OFFICE
CERTIFICATE OF CORRECTION

PATENT NO. : 11,431,615 B2
APPLICATION NO. : 17/080404
DATED : August 30, 2022
INVENTOR(S) : Xie et al.

Page 1 of 1

It is certified that error appears in the above-identified patent and that said Letters Patent is hereby corrected as shown below:

On the Title Page

Page 2: item [56] Other Publications, Column 2, Line 3: "Group, Internet-Draf, IETF, XP015126147, total 10 pages (Apr. 28," should read -- Group, Internet-Draft, IETF, XP015126147, total 10 pages (Apr. 28, --.

Signed and Sealed this
Third Day of January, 2023

Katherine Kelly Vidal

Katherine Kelly Vidal
*Director of the United States Patent and Trademark Office*